United States Patent
Diener et al.

(10) Patent No.: US 6,661,144 B1
(45) Date of Patent: Dec. 9, 2003

(54) ELECTROMOTIVE DRIVE

(75) Inventors: Karl-Friedrich Diener, Gerolzhofen (DE); Hermann-Josef Conraths, Schwabach (DE); Werner Hopf, Oberasbach (DE); Wolfgang Lienert, Nürnberg (DE); Ekkehard Pittius, Roth (DE); Peter Seitz, Pommelsbrunn (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 09/890,195

(22) PCT Filed: Jan. 14, 2000

(86) PCT No.: PCT/EP00/00269

§ 371 (c)(1),
(2), (4) Date: Aug. 6, 2001

(87) PCT Pub. No.: WO00/45055

PCT Pub. Date: Aug. 3, 2000

(30) Foreign Application Priority Data

Jan. 27, 1999 (EP) .............................. 99101472

(51) Int. Cl.$^7$ ........................ H02K 49/02; H02K 9/00
(52) U.S. Cl. ................... 310/105; 310/156.11; 310/62; 310/63
(58) Field of Search ............................. 310/156.11, 105, 310/62, 63, 90, 103, 106–109

(56) References Cited

U.S. PATENT DOCUMENTS

| 3,902,659 A | * | 9/1975 | Brinkmann et al. .......... 494/82 |
| 4,446,391 A | * | 5/1984 | Sekine et al. ................. 310/62 |
| 4,562,367 A | * | 12/1985 | Kumatani .................... 310/62 |
| 5,023,499 A | * | 6/1991 | Kuwahara ................... 310/105 |

FOREIGN PATENT DOCUMENTS

| DE | 42 29 038 A | 1/1994 |
| DE | 195 17 959 C | 8/1996 |
| EP | 0 50 771 A | 5/1982 |
| EP | 0 826 266 B1 | 3/1998 |
| WO | WO 96 37035 A | 11/1996 |

* cited by examiner

Primary Examiner—Dang Le
(74) Attorney, Agent, or Firm—Henry M. Feiereisen

(57) ABSTRACT

The aim is to improve the cooling of a self-ventilated electric motor (1). To this end, an electromagnetic speed limiting and governing device is provided between the motor shaft (3) and the fan wheel (2), the fan wheel, which is driven via an electromagnetic slip coupling (6, 10) in accordance with the motor speed, being mounted freely rotatably on the motor casing or on the motor bearing plate (5).

44 Claims, 2 Drawing Sheets

ELECTROMOTIVE DRIVE

The invention relates to an electromotive drive, with at least one fan wheel which can be driven by an electric motor, an electromagnetic slip coupling, dependent on the motor speed, being arranged between the motor shaft and the freely rotatably mounted fan wheel.

Electric motors for rail and rail-bound vehicles, such as three-phase traction motors, are increasingly being operated at high speeds, in order to keep down the motor torques and consequently the motor weight and also the size. According to EP 0 826 266 B1, a fan wheel mounted freely rotatably on the motor shaft is provided for motor cooling, an electromagnetic speed limiting and governing device which limits the delivery of cooling air to the required quantity of cooling air being formed between the motor shaft and the fan wheel, and it being possible as from a predeterminable motor speed for the fan wheel speed to be reduced in relation to the motor speed in such a way that the driving-along effect of the slip coupling can be neutralized with increasing speed of the motor shaft until it is almost ineffective and increases again to the full driving-along effect as the motor speed drops.

In the earlier German patent application 198 01 310.8, an electromotive drive of this type is described, the slip coupling being designed in such a way that the motor shaft bears permanent magnets and segments are cut out in the hub of the fan wheel, or that the fan wheel is provided with permanent magnets and the motor shaft has segmental cutouts over its circumference in such a way that, in the interaction of the segmented fan wheel hub with the permanent magnets of the motor shaft, or in the interaction of the segmented motor shaft with the permanent magnets of the fan wheel, and dependent on the motor speed, the speed limiting and governing device is effective. This slip coupling operates on the reluctance principle.

The object of the invention is to improve further an electromagnetic drive of the type described with respect to its self-ventilation or motor cooling by at least one fan wheel which can be driven by the motor.

This object is achieved according to the invention by an electromotive drive, with at least one fan wheel which can be driven by an electric motor, wherein an electromagnetic slip coupling dependent on the motor speed is arranged between the motor shaft and the freely rotatably mounted fan wheel, wherein an electromagnetic speed limiting and governing device which limits the delivery of cooling air to the required quantity of cooling air is provided between the motor shaft and the fan wheel, wherein it is possible as from a predeterminable motor speed for the fan wheel speed to be reduced in relation to the motor speed in such a way that the driving-along effect of the slip coupling can be neutralized with increasing speed of the motor shaft until it is almost ineffective and increases again to the full driving-along effect as the motor speed drops, wherein the fan wheel is mounted freely rotatably on the motor casing by means of a mounting and wherein the motor shaft bears permanent magnets and the hub of the fan wheel has an electrically conductive part or the fan wheel is provided with permanent magnets and the motor shaft is provided with an electrically conductive part. This achieves the effect that the quantity of cooling air at relatively low motor speeds is available to an adequate extent, while the quantity of cooling air to be delivered at relatively high or high motor speeds no longer increases in proportion to the increasing motor speed. The fact that, according to the invention, the fan wheel is mounted in the motor casing or on the bearing plate, and consequently not on the motor shaft, always results in an adequately high fan-wheel bearing speed, even when the relative speed of the motor shaft to the fan wheel is small or approaches zero. As a result, better running behavior and improved bearing lubrication of the fan wheel mounting are achieved. Whereas in the case of the known mounting of the fan wheel on the motor shaft the lubricant is forced by the then rotating bearing outer race and the centrifugal force toward the outer race and leads to increased bearing friction, the bearing outer race of the mounting of the fan wheel arranged in the motor housing or in the motor bearing plate is stationary, which reduces the bearing friction. The mechanical isolation of the fan wheel from the rotor of the electric motor has the effect of reducing for example bearing loads caused by a rotor imbalance.

According to one configuration of the invention, it is provided that the electrically conducting part of the fan wheel or of the motor shaft forming the electromagnetic slip coupling with the permanent magnets of the motor shaft or of the fan wheel comprises a sleeve of electrically conductive material. This has the effect that the electrically conductive sleeve, which is to be of a simple design and is seated in the magnetically permeable fan wheel hub, dispenses with the need for an additional cage winding. The simple to produce sleeve preferably consists of copper.

According to a further configuration, the fan wheel or the fan wheel hub may consist of nonmagnetic material, for example aluminum, dispensing with an additional sleeve. On the other hand, the fan wheel may be made of plastic, with an electrically conductive sleeve, for example a copper sleeve, fitted into the plastic hub. In the case of these configurations, a weight reduction is possible, which is important for drives operating at high speeds.

A further configuration is distinguished according to the invention by the fact that, for a drive with a small overall axial length, the parts of the electromagnetic slip coupling (magnets and cage) are not arranged coaxially, but radially (disk rotor principle) in relation to the motor shaft.

According to the invention, the electromagnetic slip coupling may be designed such that the center of the magnets and of the cage are axially offset, producing an axial force component which acts on the fan wheel mounting and prevents a tumbling movement. In this case a fan wheel mounting can only be configured with one bearing, for example a double-row bearing or a mounting unit, between the motor casing or the motor bearing plate and the fan wheel.

The invention also comprises a configuration, in which the electromagnetic slip coupling of which operates on the reluctance principle, whereby it is possible for the slip coupling parts also to be configured without the cage winding or copper sleeve.

In the design of the electromagnetic part of the slip coupling, pairs of permanent magnets may also be replaced by one or more bar magnets, which are able to be fitted for example into transverse bores of the motor shaft or in bores of the fan wheel. In this case, resultant centrifugal forces on the magnets can be avoided and simple fastening and fixing of the bar magnets is possible.

Advantageous configurations of the invention are specified in the further patent claims.

The invention is explained below on the basis of exemplary embodiments with reference to the drawing, in which.

Figure 1:
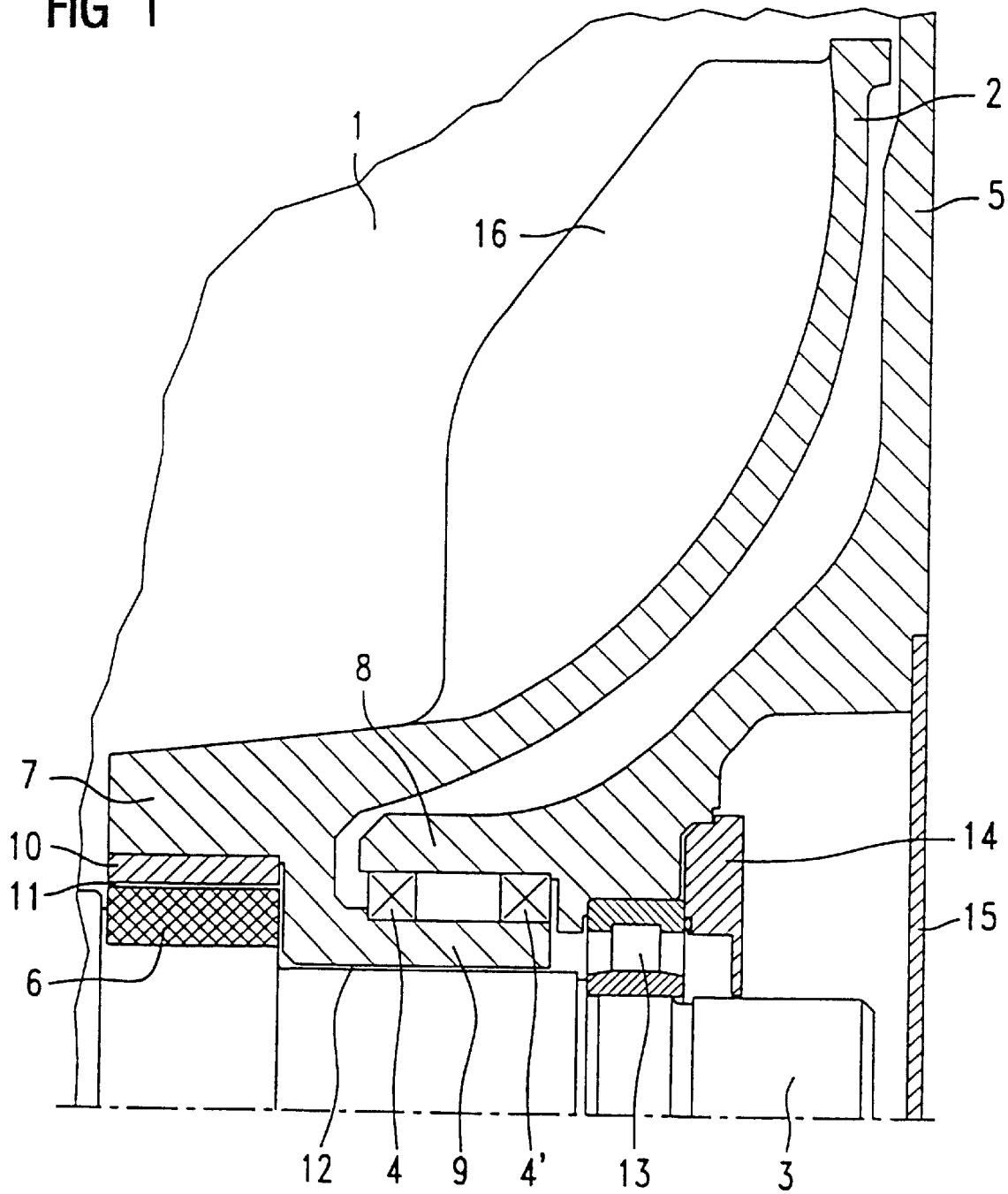
FIG. 1 shows a partial section through an electromotive drive according to the invention, as is suitable in particular for three-phase traction motors capable of being operated at high speeds.

Of an electric motor 1 known per se, a motor bearing plate and a motor casing cover 15 of the motor casing 5 are shown, as well as a motor shaft 3, a motor shaft bearing 13, a motor shaft bearing cover 14 and also a fan wheel 2 with a fan wheel blade 16. According to the exemplary embodiment depicted, the fan wheel 2 is mounted freely rotatably by means of its fan wheel hub 7 in coaxial arrangement in relation to the motor shaft 3 in the motor casing 5 or in the motor bearing plate. The mounting of the fan wheel 2, comprising two bearings 4, 4' in the configuration represented, is seated with its stationary bearing outer race in a bearing receptacle 8 of the motor casing 5 or of the motor bearing plate, with an annular formation 9 on the fan wheel hub 7 being supported against the rotating bearing inner race of the fan wheel bearing 4, 4'. As represented, the mounting of the fan wheel may comprise, for example, two bearings 4, 4' or a double-row bearing or else a mounting unit with the bearing rows 4, 4'. The mounting is also assigned an axial fixing means known per se (not represented).

Between the freely rotatably mounted fan wheel 2 and the motor shaft 3 there is an electromagnetic speed limiting and governing device for the cooling air blower. The device designed as an electromagnetic slip coupling acts in such a way that, with increasing motor speed, in particular as from a specific speed range, the drive effect on the fan wheel via the slip coupling decreases. On the other hand, with a motor speed dropping below a specific speed range, the slip coupling causes the drive effect of the coupling on the fan wheel to increase again. The parts 6, 10 of the electromagnetic slip coupling separated by a predeterminable air gap 11 are formed by magnets 6 or a cage 10. As shown by way of example in FIG. 4, the permanent magnets 6 and the cage 10 of the slip coupling are disposed in coaxial relationship to the motor shaft 3.

In the exemplary embodiment depicted, the motor shaft 3 bears permanent magnets 6, whereas the fan wheel 2 or the fan wheel hub 7 is fitted with one or more squirrel-cage or cage windings 10. The cage 10 is made from a copper sleeve, which can be fitted into the hub 7 of, for example, a plastic fan wheel 2. An air gap between the bearing formation 9 on the fan wheel hub and the motor shaft 3 is denoted by 12.

Figure 2:
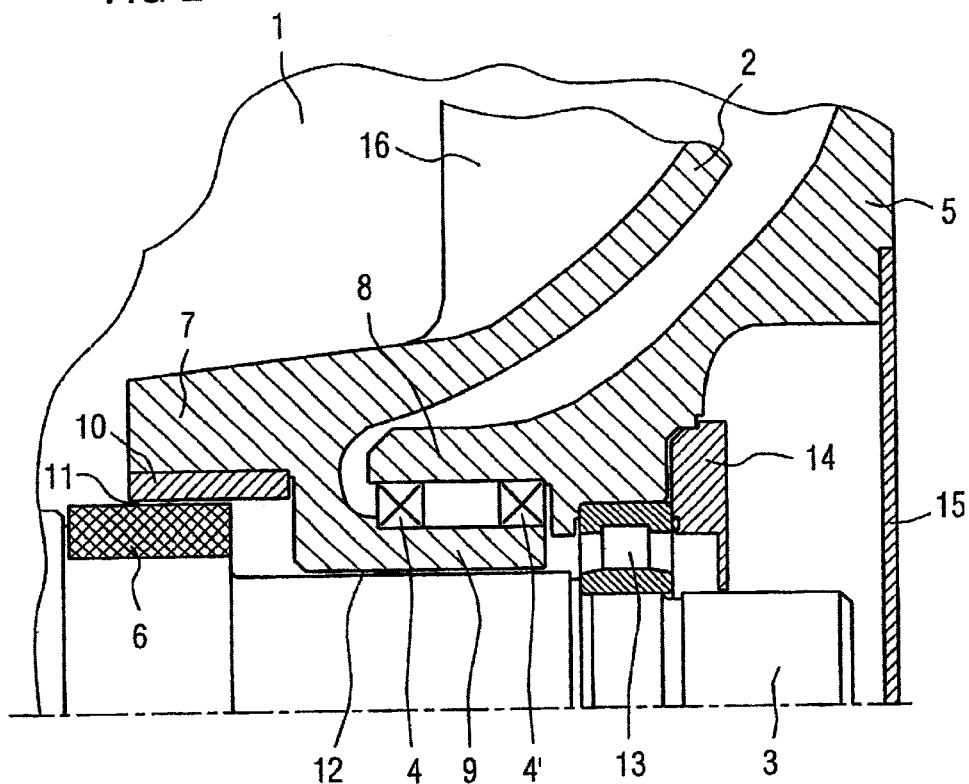
FIG. 2 shows a partial section through a modified electromotive drive according to the invention.
Figure 3:
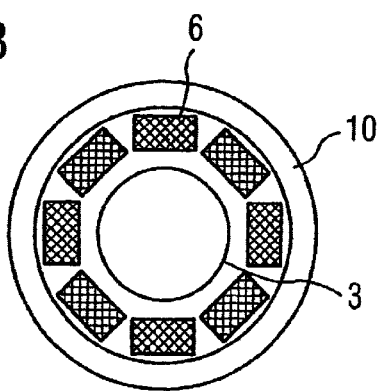
FIG. 3 shows a schematic illustration of a coaxial arrangement of the parts of the electromagnetic slip coupling.

FIG. 2 shows a partial section through a modified electromotive drive according to the invention having an electromagnetic slip coupling which is designed in such a manner that the center of the permanent magnets 6 and the center of the electrically conducting part 10 in the form of a cage are axially offset, producing an axial force component which acts on the fan wheel mounting and prevents a tumbling movement. In this case a fan wheel mounting can only be configured with one bearing, for example a double-row bearing or a mounting unit, between the motor casing 5 or the motor bearing plate and the fan wheel 2.

According to an exemplary embodiment not represented, the permanent magnets may also be arranged on the fan wheel and the electrical part 10 of the cage may be arranged on the motor shaft. The magnetic excitation of the slip coupling takes place via the permanent magnets and on the basis of the rotation of the motor shaft 3 or of the fan wheel 2. The torque required for driving along the fan wheel is produced by induction of an electric voltage in the cage 10 in the same manner in principle as in the case of an asynchronous machine with a cage rotor. The arrangement is dimensioned in particular such that—disregarding possible reaction torques—the maximum torque (breakdown torque) is reached at a predetermined speed, at which it is sufficient to overcome the drop in pressure of the aerodynamic circuit. This speed will generally lie between 50 and 75% of the highest motor speed. If the motor speed increases above this value, a lower speed is established on the basis of the torque-slip characteristic of the coupling for the fan wheel, whereby the quantity of cooling air, energy consumption and noise of the fan are reduced.

Figure 4:
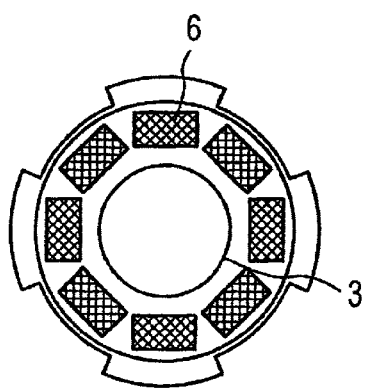
FIG. 4 shows a schematic illustration of a variation of a slip coupling.

FIG. 4 shows a modified slip coupling in which the cage 10 is formed by salient pole punchings for interaction with the permanent magents 6 to effect the speed limiting and governing device in dependence on the motor speed.

What is claimed is:

1. An electromotive drive, with at least one fan wheel (2) which can be driven by an electric motor (1) and is supported freely rotatably by a motor casing (5) of the electric motor (1) via a bearing (4, 4'), wherein an electromagnetic slip coupling dependent on the motor speed is arranged between a motor shaft (3) and the freely rotatably mounted fan wheel, wherein an electromagnetic speed limiting and governing device which limits the delivery of cooling air to the required quantity of cooling air is provided between the motor shaft (3) and the fan wheel (2), wherein the fan wheel speed decreases in relation to the motor speed, when the motor speed exceeds a predetermined level so that the slip coupling becomes increasingly ineffective to engage the fan wheel, and increases again, when the motor speed drops below the predetermined level and the slip coupling increasingly re-engages the fan wheel, and wherein the motor shaft (3) bears permanent magnets (6), and a hub (7) of the fan wheel (2) has an electrically conductive part or the fan wheel is provided with permanent magnets and the motor shaft is provided with an electrically conductive part.

2. The electromotive drive as claimed in claim 1, characterized in that the fan wheel (2) is mounted in a motor bearing plate of the motor casing (5).

3. The electromotive drive as claimed in claim 1, characterized in that the mounting (4, 4') of the fan wheel (2) is seated with a bearing outer race in a bearing receptacle (8) of the motor casing (5) or motor bearing plate and an annular formation (9) on the fan wheel hub (7) is supported against the rotating bearing inner race of the fan wheel bearing (4, 4').

4. The electromotive drive as claimed in claim 3, characterized in that parts of the electromagnetic slip coupling (6, 10) are dimensioned such that the maximum breakdown torque or the highest driving-along effect between the motor shaft (3) and the fan wheel (2) is reached at a predetermined motor speed, which is sufficient to overcome the drop in pressure of the aerodynamic circuit.

5. The electromotive drive as claimed in claim 3, characterized in that it is intended for three-phase traction motors capable of being operated at high speeds.

6. The electromotive drive as claimed in claim 1, characterized in that the electrically conducting part of the fan wheel or of the motor shaft forming the electromagnetic slip coupling with the permanent magnets (6) of the motor shaft (3) or of the fan wheel (2) comprises a sleeve (10) of electrically conductive material.

7. The electromotive drive as claimed in claim 6, characterized in that the permanent magnets (6) and/or the sleeve

(10) are arranged in an annular or segmentally annular manner on the hub (7) of the fan wheel (2) or on the motor shaft (3).

8. The electromotive drive as claimed in claim 6, characterized in that one part of the slip coupling comprises one or more bar magnets fitted in bores of the motor shaft or in bores of the fan wheel.

9. The electromotive drive as claimed in claim 6, characterized in that parts of the electromagnetic slip coupling (6, 10) are dimensioned such that the maximum breakdown torque or the highest driving-along effect between the motor shaft (3) and the fan wheel (2) is reached at a predetermined motor speed, which is sufficient to overcome the drop in pressure of the aerodynamic circuit.

10. The electromotive drive as claimed in claim 6, characterized in that the sleeve is made of copper.

11. The electromotive drive as claimed in claim 1, characterized in that the permanent magnets (6) and/or the sleeve (10) are arranged in an annular or segmentally annular manner on the hub (7) of the fan wheel (2) or on the motor shaft (3).

12. The electromotive drive as claimed in claim 11, characterized in that the fan wheel (2) has a hub (7) of nonmagnetic material, such as aluminum, or in that the fan wheel consists of plastic and a sleeve (10) of electrically conductive material is fitted into the fan wheel hub.

13. The electromotive drive as claimed in claim 11, characterized in that one part of the slip coupling comprises one or more bar magnets fitted in bores of the motor shaft or in bores of the fan wheel.

14. The electromotive drive as claimed in claim 1, characterized in that the fan wheel (2) has a hub (7) of nonmagnetic material, or in that the fan wheel consists of plastic and a sleeve (10) of electrically conductive material is fitted into the fan wheel hub.

15. The electromotive drive as claimed in claim 14, characterized in that the hub is made of aluminum.

16. The electromotive drive as claimed in claim 1, characterized in that parts of the electromagnetic slip coupling (6, 10) are arranged in coaxial or radial arrangement in relation to the motor shaft (3).

17. The electromotive drive as claimed in claim 1, characterized in that the motor shaft bears permanent magnets and segments are cut out in the shaft of the fan wheel, or in that the fan wheel is provided with permanent magnets and the motor shaft has segmental cutouts over its circumference in such a way that, in the interaction of the segmented fan wheel hub with the permanent magnets of the motor shaft, or in the interaction of the segmented motor shaft with the permanent magnets of the fan wheel, and dependent on the motor speed, the speed limiting and governing device is effective.

18. The electromotive drive as claimed in claim 1, characterized in that the permanent magnets of one part of the slip coupling has a center which is axially offset in relation to a center of the other part of the slip coupling, forming a cage.

19. The electromotive drive as claimed in claim 18, characterized in that the mounting of the fan wheel in the motor casing or in the motor bearing plate comprises a single bearing.

20. The electromotive drive as claimed in claim 1, characterized in that one part of the slip coupling comprises one or more bar magnets fitted in bores of the motor shaft or in bores of the fan wheel.

21. The electromotive drive as claimed in claim 20, characterized in that it is intended for three-phase traction motors capable of being operated at high speeds.

22. The electromotive drive as claimed in claim 1, characterized in that at least one fan wheel (2) for encapsulated or enclosed-ventilated electric motors (1) for rail vehicles and rail-bound vehicles for suction or pressure ventilation is freely mounted and formed on at least one motor bearing plate (5).

23. The electromotive drive as claimed in claim 22, characterized in that it is intended for three-phase traction motors capable of being operated at high speeds.

24. The electromotive drive as claimed claim 1, characterized in that parts of the electromagnetic slip coupling (6, 10) are dimensioned such that the maximum breakdown torque or the highest driving-along effect between the motor shaft (3) and the fan wheel (2) is reached at a predetermined motor speed, which is sufficient to overcome the drop in pressure of the aerodynamic circuit.

25. The electromotive drive as claimed in claim 1, characterized in that it is intended for three-phase traction motors capable of being operated at high speeds.

26. An electromotive drive, comprising:
   an electric motor having a motor casing and a motor shaft received in the motor casing;
   at least one fan wheel driven by the electric motor and having a hub,
   a bearing unit positioned between the motor casing and the fan wheel for so supporting the fan wheel as to freely rotate with respect to the motor casing;
   an electromagnetic speed limiting and governing device for controlling a supply of cooling air, said electromagnetic speed limiting and governing device including an electromagnetic slip coupling, which is disposed between the motor shaft and the fan wheel and so configured that at a predetermined motor speed an engagement action of the slip coupling with the fan wheel decreases to almost zero as the motor speed further increases, and increases to full engagement action, as the motor speed drops again below the predetermined motor speed, and
   wherein the slip coupling includes a configuration selected from the group consisting of a first configuration in which the motor shaft supports a permanent magnet arrangement and the hub of the fan wheel has an electrically conductive part, and a second configuration in which the fan wheel is provided with a permanent magnet arrangement and the motor shaft is provided with an electrically conductive part.

27. The electromotive drive of claim 26, wherein the fan wheel is mounted in a motor bearing plate of the motor casing.

28. The electromotive drive of claim 26, wherein the motor casing has a bearing receptacle, wherein the bearing unit is seated with an outer bearing race in one of the bearing receptacle and motor bearing plate, wherein the hub has an annular flange supported against a rotating inner bearing race of the bearing unit.

29. The electromotive drive of claim 26, wherein the electrically conducting part of the first and second configurations includes a sleeve of electrically conductive material.

30. The electromotive drive of claim 29, wherein the sleeve is made of copper.

31. The electromotive drive of claim 29, wherein the fan wheel is made of plastic, and wherein the sleeve is received in the hub of the fan wheel.

32. The electromotive drive of claim 26, wherein at least one of the permanent magnet arrangement and the electrically conducting part of the first and second configurations has an annular shape.

33. The electromotive drive of claim 26, wherein at least one of the permanent magnet arrangement and the electrically conducting part of the first and second configurations has segments of annular shape.

34. The electromotive drive of claim 26, wherein the hub of the fan wheel is made of nonmagnetic material.

35. The electromotive drive of claim 34, wherein the hub is made of aluminum.

36. The electromotive drive of claim 26, wherein the permanent magnet arrangement and the electrically conducting part of the first and second configurations of the slip coupling are disposed in coaxial relationship to the motor shaft.

37. The electromotive drive of claim 26, wherein the permanent magnet arrangement and the electrically conducting part of the first and second configurations of the slip coupling are disposed in radial relationship to the motor shaft.

38. The electromotive drive of claim 26, wherein the electrically conducting part of the first and second configurations of the slip coupling is formed by salient pole punchings for interaction with the permanent magnet arrangement to effect the speed limiting and governing device in dependence on the motor speed.

39. The electromotive drive of claim 26, wherein the permanent magnet arrangement has a center which is axially offset in relation to a center of the electrically conducting part, wherein the electrically conducting part is formed as a cage.

40. The electromotive drive of claim 26, wherein the bearing unit includes a single bearing.

41. The electromotive drive of claim 26, wherein the permanent magnet arrangement of the first and second configurations of the slip coupling includes bar magnets received in bores of the motor shaft and in bores of the hub of the fan wheel, respectively.

42. The electromotive drive of claim 26, wherein the fan wheel is freely mounted and supported by a motor bearing plate and configured for an encapsulated or enclosed-ventilated electric motor used for rail vehicles and track-bound vehicles for application as suction or pressure ventilation.

43. The electromotive drive of claim 26, wherein the permanent magnet arrangement and the electrically conducting part of the first and second configurations of the slip coupling are configured such that a maximum breakdown torque commensurate with a maximum engagement action between the motor shaft and the fan wheel is reached at the predetermined motor speed, which is sufficient to overcome a drop in pressure of an aerodynamic circuit.

44. The electromotive drive of claim 26 for use in a three-phase traction motor capable of being operated at high speed.

* * * * *